United States Patent [19]

Clayton

[11] Patent Number: 4,573,650

[45] Date of Patent: Mar. 4, 1986

[54] FIRE-SAFE AIRCRAFT WASTE DISPOSAL SYSTEM

[75] Inventor: James L. Clayton, Everett, Wash.

[73] Assignee: The Boeing Company, Seattle, Wash.

[21] Appl. No.: 428,440

[22] Filed: Sep. 29, 1982

[51] Int. Cl.4 .................. B64D 11/00; B64D 11/04
[52] U.S. Cl. ............................... 244/118.5; 244/1 R
[58] Field of Search ............ 244/118.5, 118.1, 137 R, 244/1 R, 129.1; 220/1 T, 1 V

[56] References Cited

U.S. PATENT DOCUMENTS

| 2,367,538 | 1/1945 | Sullivan | 244/118.1 |
| 3,866,861 | 2/1975 | Ratcliff et al. | 244/118.5 |
| 4,055,317 | 10/1971 | Greiss | 244/118.5 |

FOREIGN PATENT DOCUMENTS 0673538  7/1979  U.S.S.R. .................. 244/118.5

Primary Examiner—Trygve M. Blix
Assistant Examiner—Rodney Corl
Attorney, Agent, or Firm—Hughes, Barnard & Cassidy

[57] ABSTRACT

An improved fire-safe waste disposal system uniquely suitable for use in the aft bulk cargo hold (22) of a large capacity passenger aircraft which is compatible with, and can be readily interfaced with, FAA approved waste disposal chutes (39) extending through the passenger deck (25) from the aft galley into the bulk cargo hold (22) and comprising a standardized aircraft cargo container base (40), a floor (45) mounted on the base (40) and parallel therewith, a first pair of vertically extending walls (46, 49) secured to the floor (45) with one of the walls (49) being normal to the floor (45), the other of the walls (46) defining an included obtuse angle with the floor (45) and with the wall (49) having a greater height than the wall (46), and with a second pair of walls (50) rigidly secured to the first pair of walls (46, 49) and to the floor (45) in airtight fire-safe relation, a top (44) secured to the walls (46, 49, 50) in airtight fire-safe relation with the top (44) being normal to the wall (46) and defining an acute angle with respect to the wall (49), and an access opening (55) formed in the top (44) for mutual engagement with the waste chute (39). The fire-safe waste disposal container (38) includes a lip formed on the standard LD2 type base (40) mutually engageable with floor mounted tracks (61, 62) for securely clamping the container (38) to the floor (29) of the bulk cargo hold (22).

1 Claim, 8 Drawing Figures

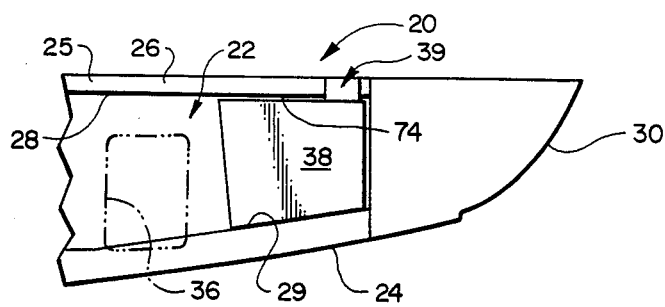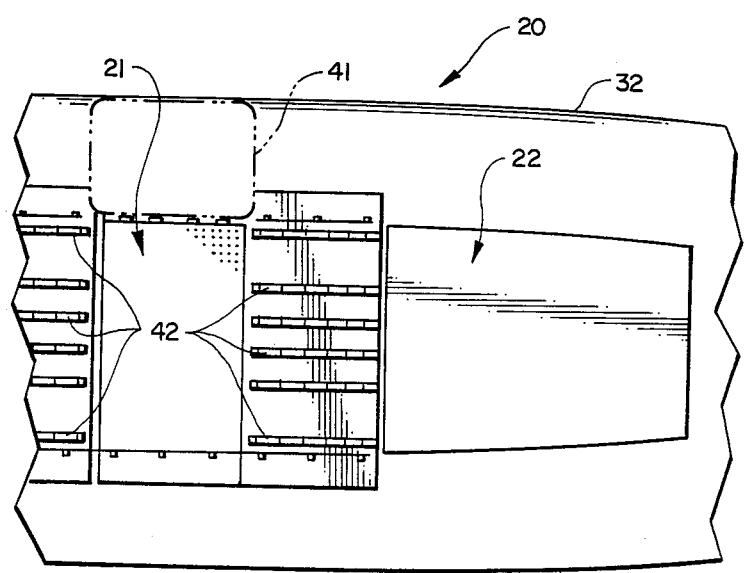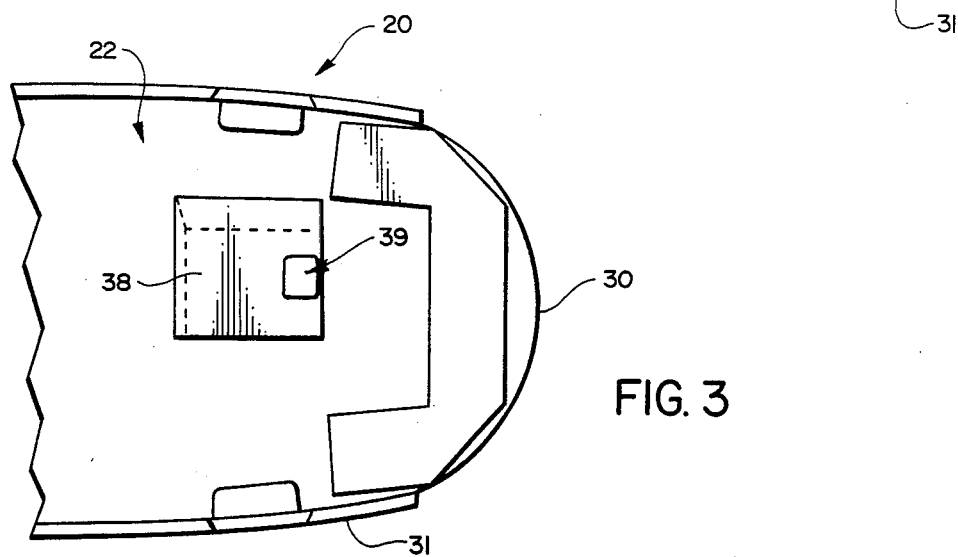

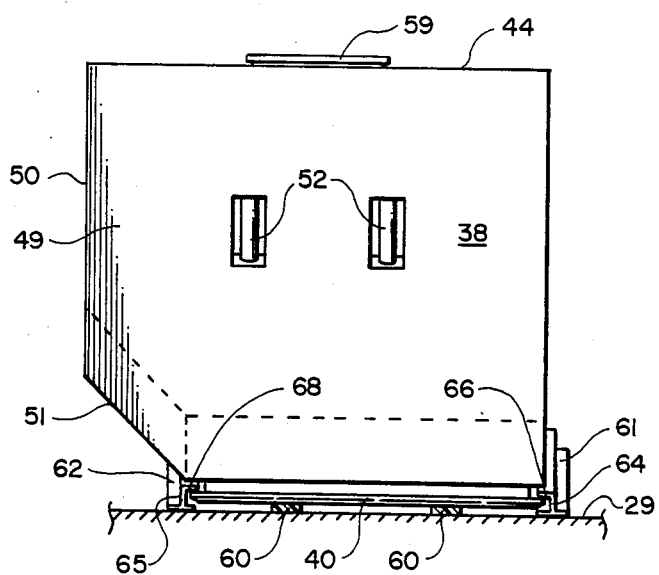
FIG. 6
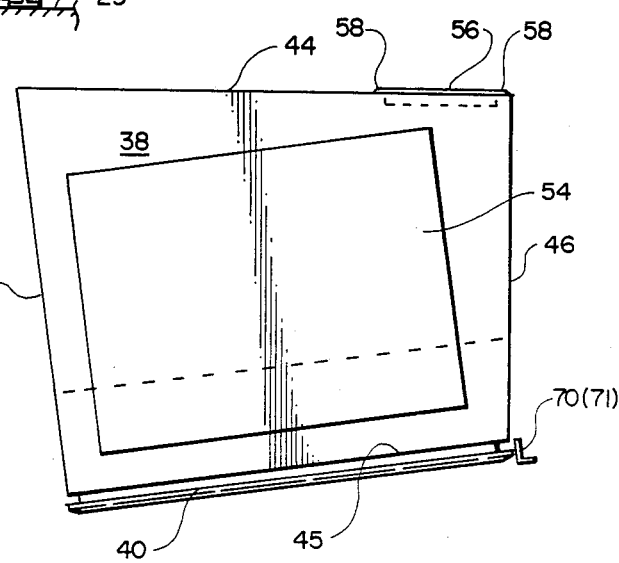
FIG. 7
FIG. 8
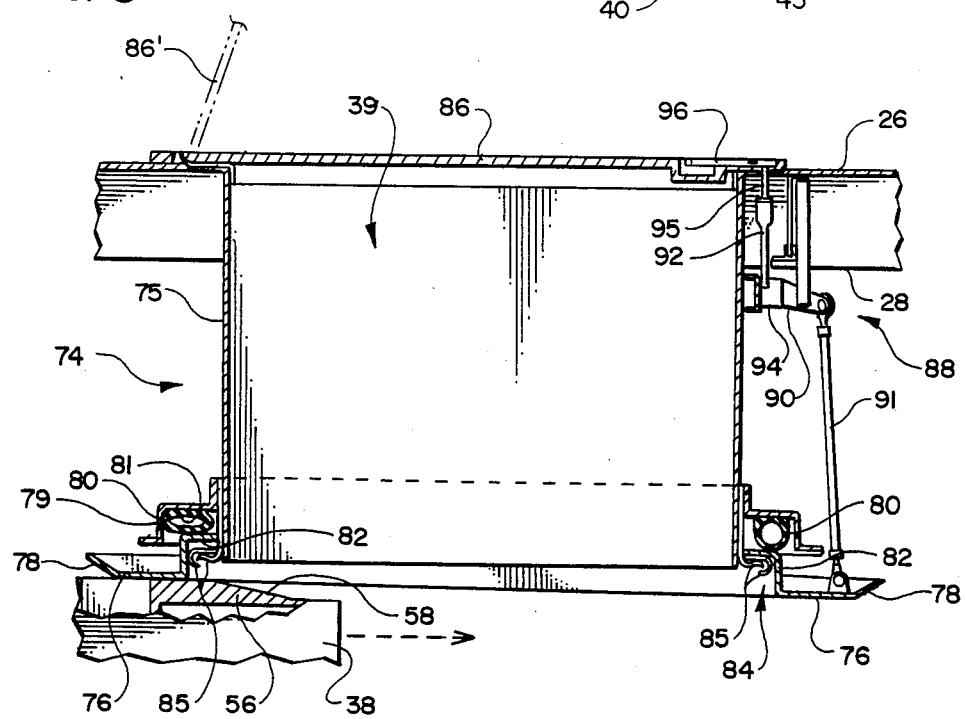

FIRE-SAFE AIRCRAFT WASTE DISPOSAL SYSTEM

BACKGROUND OF THE INVENTION

1. Technical Field

The present invention relates generally to a fire-safe waste disposal system for aircraft; and, more particularly, to an improved fire-safe waste container suitable for disposition in the bulk cargo hold of a large capacity passenger aircraft of the type wherein such bulk cargo hold is siutated at the aft end of the lower lobe in the aircraft fuselage below the aft galley. Because of the peculiar nature of the configuration of the bulk cargo volumetric space, effective utilization thereof presents unique problems; and, consequently, the present invention relates more specifically to a special configuration for a fire-safe waste disposal container, special restraints therefor to prevent shifting of the container during in-flight operations, and a particular arrangement for handling the container during loading and/or unloading thereof.

2. Background Art

Those skilled in the art will appreciate that most large capacity passenger aircraft of the type presently being manufactured tend to be somewhat rounded or oblate in cross-sectional configuration and become progressively smaller towards the aft end of the aircraft as a result of aerodynamic fairing of the fuselage. Generally, such aircraft are divided into upper and lower lobes by the passenger deck which, for purposes of this description, may be assumed to be in a horizontal plane. Thus, the passenger deck defines the floor of the upper lobe of the aircraft which is dedicated to passenger seating and such passenger service functions as galleys, lavatories, "carry on" luggage stowage, etc.; while also defining the ceiling of the lower lobe which is dedicated to cargo holds, bulk cargo holds and various equipment spaces. Generally, a large portion of the lower lobe comprises volumetric space which can be effectively and efficiently used for purposes of, for example, regularized stowage for containerized baggage and other cargo, as well as providing utilitarian space for equipment. However, the aft end of the lower lobe is commonly not prime volumetric space since the aerodynamically faired fuselage tends to rapidly converge towards the aft end of the aircraft with that portion of the fuselage defining the floor of the aft cargo hold tending to be inclined upwardly towards the ceiling and with those portions of the fuselage defining the aft walls also converging and being fairly rounded. Generally, such space is simply not suitable for stowage of conventional standard cargo containers, and particularly those containers designated as an "LD3" cargo container. Thus, such containers are generally too large to be located in the aft portion of the lower lobe and require rather standardized restraint systems for preventing movement of the container during in-flight operations; but, wherein such standard restraint systems do not find ready application within the peculiarly shaped aft end of the lower lobe. It is for this reason that the aft end of the lower lobe is commonly devoted to stowage of bulk cargo as contrasted with containerized baggage and/or cargo.

At the same time, however, such large capacity passenger aircraft tend to include multiple galleys on the passenger deck—for example, there is commonly a forward galley for providing service for first class passengers and for passengers located in the coach cabin immediately aft of the first class section; while an aft galley is commonly provided for servicing passengers in the tail end of the aircraft. Such aircraft have long had a problem with regard to the disposition of refuse and waste, and particularly the waste left over from meals served to the passengers. Thus, food and drink containers, napkins, utensils and the like are compactly stored prior to such time that the passengers are served; but, those materials must be quickly disposed of after the passengers are served and prior to landing. Time constraints generally prohibit the crew from carefully restacking the waste and refuse; and, consequently, the volume of space required to dispose of the refuse is often much greater than the volume occupied thereby prior to use. Therefore, a need has long existed for an effective safe means for disposing of the refuse. It had been proposed that such refuse be discharged by the crew members through chutes communicating with containers located in the main cargo hold of the aircraft. However, the FAA initially rejected such proposals because of potential fire hazards—a serious potential problem recognizing that the waste materials will commonly include cigarette stubs or the like. Therefore, for a long period of time, refuse had to be stored in the upper lobe of the aircraft, sometimes leading to undesirable, unsightly, or unsanitary conditions.

However, one such proposal did ultimately meet with FAA approval; and, that proposal is disclosed in U.S. Pat. No. 3,866,861—Ratcliff et al, a patent assigned to the assignee of the present invention. The Ratcliff et al patent discloses a fire-safe aircraft refuse disposal system which was primarily designed for use with, and is being used with, relatively large wide-body aircraft. Moreover, the system there disclosed was designed principally for location in the main cargo hold of the aircraft beneath the mid-ship galley. Such location permitted use of standardized LD3 containers which, unfortunately, were not rated as a "Class D" fireproof container. Consequently, the fire-safe aircraft refusal disposal system disclosed in the aforesaid Ratcliff et al patent provided for a special fireproof cannister which was loadable into the nonfire-safe LD3 cargo container in such a manner as to permit communication between the interior fireproof cannister and a waste chute disposed in the passenger deck and located in the aircraft's mid-ship galley. Because the fireproof cannister was disposed within a standard cargo container, and because the standard cargo container was situated in the main cargo hold, the container was readily restrainable in place in a completely conventional manner as disclosed in the patent.

Unfortunately, however, while the aforesaid Ratcliff et al fire-safe aircraft refuse disposal system is highly effective and approved for use in the main cargo hold of such aircraft, the system finds no utility in the bulk cargo hold. This is principally due to the fact that there is insufficient space within the bulk cargo hold to accommodate the LD3 container and its enclosed fireproof cannister; and, when scaled down in size, the resultant fireproof cannister within the scaled down container fails to provide sufficient volumetric space to effectively serve the desired function. Moreover, the upwardly inclined floor and converging wall configuration in the aft bulk cargo hold present special problems with regard to properly locating and restraining such a fire-safe container while insuring maintenance of a fire-safe airtight communicating chute extending through the passenger deck from the aft galley to the bulk cargo hold.

SUMMARY OF THE INVENTION

An improved fire-safe waste disposal system uniquely suitable for use in the aft bulk cargo hold of a large capacity passenger aircraft is disclosed which is compatible for use with, and can be readily interfaced with, a tried and proven FAA approved waste disposal chute extending through the passenger deck from the aft galley into the bulk cargo hold at the aft end of the aircraft lower lobe, and which is readily adaptable to the peculiarly shaped configuration of the bulk cargo hold; yet, which does not require the use of a fire-safe cannister within a container, which is easily restrained for maintaining an airtight seal with the waste chute during in-flight conditions and, which employs a standard LD2 cargo container base configuration, thereby not only permitting use of standard containerized cargo handling equipment during loading and/or unloading but, also, enabling the fire-safe container to function as a multipurpose container. That is, the unique container of the present invention can serve not only as a fire-safe container for waste and refuse disposal, but, additionally, it can serve as a storage container for many hazardous materials requiring special storage treatment, as well as functioning to store nonhazardous and/or nonflammable cargo of the type commonly stored in normal cargo containers. The invention further provides for an in-flight fire-safe waste container restraint system and a waste container loading/unloading system which serves to insure accurate positioning of the fire-safe waste container within the bulk cargo hold and with respect to the passenger deck internal waste chute.

In one of its principal aspects, it is an object of the invention to provide a uniquely configured airtight, fire-safe cargo container which readily permits of disposition of the container within a bulk cargo hold; yet, wherein the container can be easily handled by conventional containerized cargo handling mechanized systems and, therefore, which may function as a multi-purpose container suitable for handling not only waste material presenting fire hazards, but, also, regular cargo and/or hazardous cargo.

A more specific object is the provision of an improved fire-safe container which does not require a "container within a container" to meet FAA fire-safe requirements and which can, therefore, provide the requisite volume of fire-safe storage space within a relatively small lightweight container that can be configured to fit within the cramped irregular confines of the bulk cargo hold in the aft end of the lower lobe of a large capacity passenger aircraft.

A further object of the invention is the provision of a fire-safe container of the foregoing character which permits of stable interfacing with existing FAA approved through-passenger-deck fire-safe waste chutes, and wherein the interengaging faces of the waste chute on the one hand and the container on the other are entirely fail-safe during in-flight operation.

DESCRIPTION OF THE DRAWINGS

These and other objects and advantages of the present invention will become more readily apparent upon reading the following detailed description and upon reference to the attached drawings, in which:

FIG. 1 is a fragmentary diagrammatic side elevational view of the lower lobe bulk cargo hold of a typical large capacity passenger aircraft and, here illustrating the fire-safe waste container of the present invention locked in position in communicating relationship with the waste chute extending through the passenger deck from the aft galley of the aircraft;

FIG. 2 is a fragmentary diagrammatic plan view, with parts removed for purposes of clarity, here illustrating on a much smaller scale the main lower lobe cargo hold and cargo access door of an aircraft through which the fire-safe waste container of the present invention may be on-loaded and/or off-loaded and, illustrating also, the relative position of the bulk cargo hold within which the waste container of the present invention is positioned when in use;

FIG. 3 is a fragmentary diagrammatic plan view of the lower lobe bulk cargo hold in the aircraft, again with parts removed for purposes of clarity, here illustrating the waste container of the present invention positioned beneath the waste chute extending from the aft galley on the passenger deck;

FIG. 6 is a front elevational view looking in the aft direction of the waste container of the present invention restrained with respect to the deck of the lower lobe bulk cargo hold;

FIG. 7 is a side elevational view of the waste container of the present invention, here illustrating the container in an operational position abutting fixed stops at the aft end of the lower lobe bulk cargo hold; and, FIG. 8 is a fragmentary vertical sectional view taken through the passenger deck substantially along the line 8—8 in FIG. 5, here illustrating details of the waste chute and both the locking and sealing mechanisms employed to permit interfacing of the waste container of the present invention with the aft galley via the waste chute under fire-safe operating conditions and, illustrating also, a fragmentary portion of the container as it is moving from left to right towards a fully seated position in the lower lobe bulk cargo hold.

Figure 4:
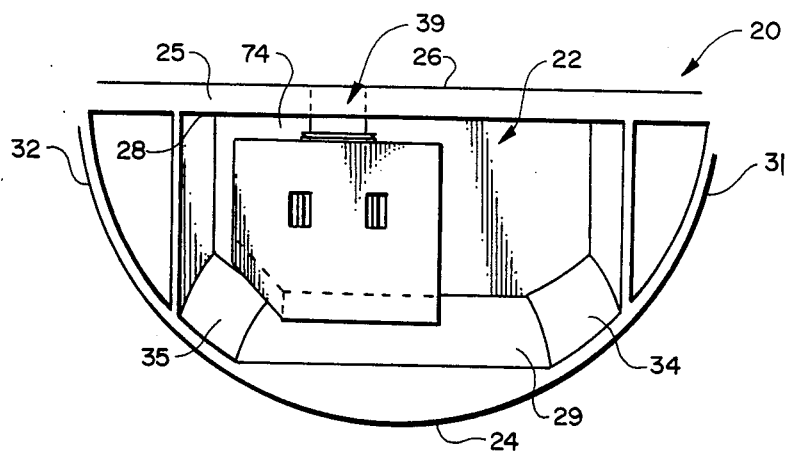
FIG. 4 is a diagrammatic vertical elevational view looking aft and depicting the waste container of the present invention within the lower lobe bulk cargo hold.

While the invention is susceptible of various modifications and alternative forms, a specific embodiment thereof has been shown by way of example in the drawings and will herein be described in detail. It should be understood, however, that it is not intended to limit the invention to the particular form disclosed but, on the contrary, the intention is to cover all modifications, equivalents and alternatives falling within the spirit and scope of the invention as expressed in the appended claims.

DETAILED DESCRIPTION

Environment of the Invention

Turning now to the drawings and, considering first FIGS. 1 through 4 conjointly, there has been illustrated in highly diagrammatic fragmentary form, that portion of the lower lobe, generally indicated at 20, of a large capacity passenger aircraft (not shown), and which contains the main cargo hold, generally indicated at 21, and the bulk cargo hold, generally indicated at 22, in the aft end of the aircraft lower lobe. It is, of course, to be understood that many conventional components and structural details having no bearing on the present invention have been eliminated from the drawings for purposes of clarity and to facilitate an understanding of the invention.

As is conventional with the aft portion of the lower lobe 22 of such aircraft, the fuselage is aerodynamically faired towards the aft end such that the rear lower portion 24 (FIG. 1) of the fuselage tends to converge upwardly towards the horizontal deck 25 which here separates the lower and upper lobes of the aircraft and defines the floor 26 in the passenger cabin (not shown) disposed in the upper lobe and the ceiling 28 in the bulk cargo hold 22. The construction is such that the floor 29 in the bulk cargo hold is upwardly inclined towards the aft end 30 of the aircraft. Moreover, as more clearly illustrated by reference to FIGS. 2 and 4 conjointly, it will be noted that that portion of the fuselage defining the sidewalls 31, 32 of the bulk cargo hold 22 are rounded or partially oblate in configuration, defining a relatively narrow floor 29 having rearwardly and upwardly extending rounded edges 34, 35 and a comparatively wider ceiling 28; with the sidewalls 31, 32 also converging towards the aft end of the aircraft as best shown in FIG. 3, thus meaning that the bulk cargo hold 22 tends to get even narrower towards the aft end thereof.

Thus, it will be appreciated that the aircraft structure is such that the bulk cargo hold 22 defines relatively confined and cramped quarters which get progressively more so towards the aft end of the hold and wherein the floor 29 on which cargo must be stored defines an inclined ramp. Such quarters simply do not provide sufficient space for receiving and storing standard cargo containers; nor is such space as is provided suitably configured for such purpose. It is for this reason that the bulk cargo hold is intended for stowage of individual items of bulk cargo; and, to this end, the bulk cargo hold is provided with a relatively small cargo door illustrated diagrammatically in phantom at 36 in FIG. 1. Thus, as will be noted upon inspection of FIG. 1, the bulk cargo hold 22 is here shown with a fire-safe waste disposal container embodying features of the present invention and diagrammatically illustrated at 38, such container being in communication with a waste chute, generally indicated at 39, extending through the deck 25 from the aft galley (not shown) located in the upper lobe of the aircraft. As will be noted, the container 38 is substantially larger than the cargo door 36 in the bulk cargo hold 22, extending from floor 29 to ceiling 28 (FIGS. 1 and 4) and occupying the majority of the volumetric space at the aft end of the bulk cargo hold 22 (FIG. 4).

In keeping with one of the important aspects of the present invention, the fire-safe waste disposal container 38 which is hereinafter described in greater detail, is provided with a base portion 40 (best shown in FIGS. 5 through 7) comprising the standard base for conventional LD2 cargo containers, thereby permitting handling of the container 38, including on-loading and off-loading thereof, with conventional cargo container handling equipment. The arrangement is such that the fire-safe container 38 embodying the features of the present invention, because of its standard LD2 base construction 40, can be off-loaded and on-loaded with conventional mechanized conveyor systems (not shown) through the main cargo hold door 41 (FIG. 2).

Once received within the main cargo hold 21, the container 38 can be stowed therein in a completely conventional manner if it is not to be used as a fire-safe waste disposal container; or, alternatively, it can be moved along the conventional floor mounted roller tracks 42 towards the bulk cargo hold 22 and through the net-type partition (not shown) which conventionally separates the bulk cargo hold 22 from the main cargo hold 21. Such handling is again permitted because the fire-safe waste disposal container of the present invention includes a standard LD2 base configuration 40.

Fire-Safe Waste Container

Figure 5:
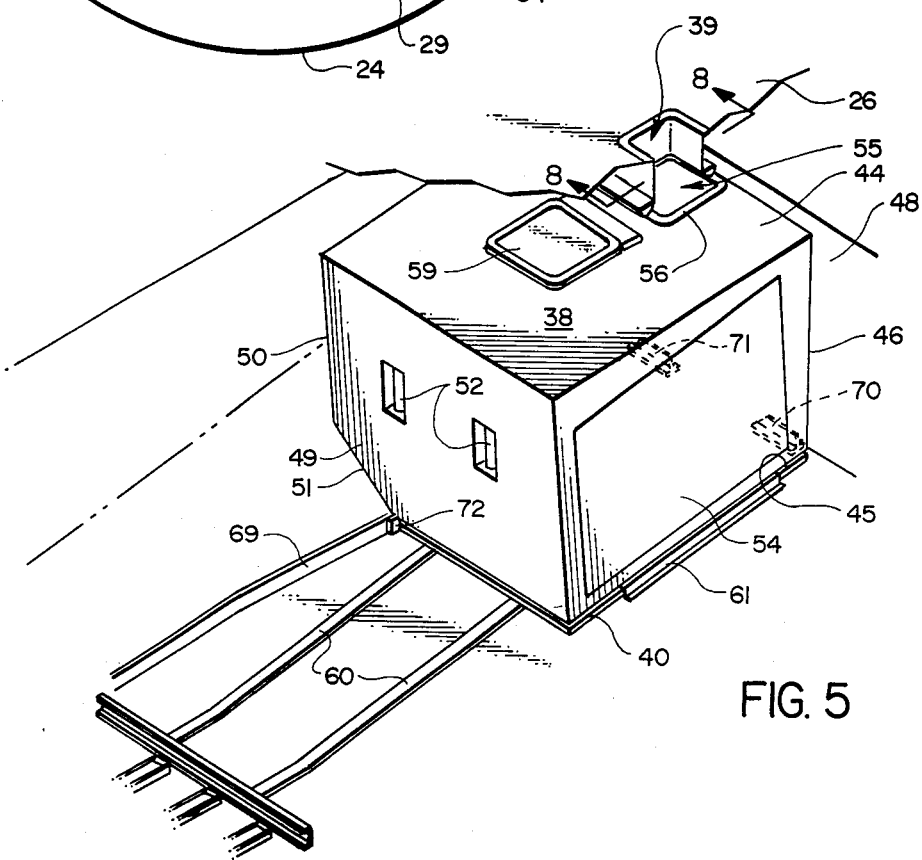
FIG. 5 is a fragmentary diagrammatic perspective view illustrating particularly the means for guiding the waste container into a proper restrained position relative to the waste chute communicating with the aft galley.

Turning now to FIGS. 5 through 7, a fire-safe waste disposal container 38 embodying features of the present invention has been illustrated in greater detail, such container incorporating the geometric configuration of a standard LD2 base 40 as previously indicated. While it is essential that the container 38 comprise a Class D airtight fire containing vessel in order to meet FAA requirements, the particular structural details and fabrication techniques employed to render the container 38 of the present invention fireproof do not form any part of the invention; are well known to persons skilled in the art; and, consequently, will not be detailed herein. Suffice it to say that standard cargo containers, while commonly made of fireproof materials, are not generally made to such close tolerances as to render the containers airtight; and, consequently, a standard cargo container is not suitable for use in the present invention and would not have such utility even if manufactured in the particular unique geometrical configuration herein disclosed. It should, however, be noted that such containers are commonly formed of aluminum composite honeycomb materials or the like to provide structural strength, and such materials are fire-safe and are, therefore, suitable for use in forming the container of the present invention.

In accordance with one of the important aspects of the present invention, the fire-safe waste disposal container 38 is configured such that it is generally conformal to the shape of the bulk cargo hold surfaces with which it will be in close proximity when properly positioned. Thus, referring to FIG. 7, it will be noted that the container 38, while having a standard LD2 base 40, is generally of an irregularly shaped four-sided polygon when viewed from the side with none of the four sides being parallel. Thus, the container 38 is provided with a generally flat top wall 44 adapted to be positioned in close proximity to, and parallel to, the ceiling 28 defined by the deck 25 (FIG. 4). The floor 45 of the container comprises a flat surface mounted on the standard LD2 base 40 and converges upwardly towards the container top 44 in the aft direction so that the container floor 45 and base portion 40 can be seated squarely and flushly on the inclined ramp-like floor 29 of the bulk cargo hold 22. The rear wall 46 of the container defines an included 90° angle with the top 44 and an included obtuse angle with the floor 45, thereby permitting the rear wall 46 of the container to be mounted in close proximity to the vertical rear wall 48 (FIG. 5) of the bulk cargo hold 22. Finally, the front wall 49 of the container is normal to the floor 45, while it defines an acute included angle with the top 44. Further, the container when viewed from one end thereof (FIGS. 5 and 6), includes end walls 46, 49 which are of truncated rectangular configuration having the same width, but with different heights (wall 46 being shorter than wall 49 as shown in FIG. 7)

and wherein the lower left wall 50 is inclined sharply as indicated at 51 so as to be generally conformal to the upwardly sloped rounded portion 35 of the bulk cargo hold floor 29 (FIG. 4). Thus, the foregoing arrangement permits optimized use of the volumetric space in the bulk cargo hold 22 within which the container 38 is positioned during in-flight use.

In further keeping with the present invention, the wall 49 is provided with a pair of recessed handles 52 for facilitating off-loading of the container from an in-use position in the aft starboard portion of the bulk cargo hold 22. A door, generally indicated at 54 in FIGS. 5 and 7, of any suitable size and construction provided only that it is capable of being closed in airtight sealing relationship with the container, is provided for permitting removal of refuse from the container 38 either onboard or subsequent to off-loading of the container from the aircraft. Finally, the top 44 of the container is provided with an access opening, generally indicated at 55 in FIG. 5, which is positioned to be mounted in registration with, and airtight sealing relation with, the chute 39 extending through the aircraft deck 25. Access opening 55 is provided with a raised fiberglass or metal rim 56 having sloping flanks 58 as best viewed in FIGS. 7 and 8. A cover, generally indicated at 59 in FIGS. 5 and 6 may be hingedly mounted on the top wall 44 in any suitable fashion for closing the access opening 55 during off-loading operations when the container 38 contains trash posing a fire hazard; and, which can also be utilized to close the container 38 when it is being employed for storage of cargo in the main cargo hold 21. Indeed, it is preferable that the cover 59 be designed such that when in the closed position (not shown), it can be securely locked in airtight sealing relation for maintaining the container 38 airtight during off-loading or when used to store hazardous or flammable cargo.

During an on-loading operation, the container 38 of the present invention is, as previously indicated, first moved into the main cargo hold 21 through the main cargo door 41 (FIG. 2) and then moved in an aft direction towards the bulk cargo hold 22 over conventional roller tracks 42. Upon entry into the bulk cargo hold 22, the container 38 is received on a plurality of skid strips 60 (FIG. 5) which are preferably formed of suitable plastic material having a coefficient of friction selected such that the empty container can be pushed up the inclined ramp-like floor 29 with relative ease while, at the same time, once the container is locked in a restrained position, the strips 60 will tend to frictionally hold the container in place as contrasted with roller tracks of the type employed in the main cargo hold which would tend to enhance the possibility that the fire-safe waste container 38 might roll down the ramp-like floor 29 during in-flight operations.

As previously indicated, proper orientation and registration of the access opening 56 in the container top wall 44 with the waste chute 39 extending through the deck is essential in order that an airtight fire-safe relationship will exist at all times. To accomplish this, a pair of channel-like tracks 61,62 (FIG. 6) are rigidly secured to the floor 29 in the bulk cargo hold 22 with the tracks 61, 62 extending rearwardly in parallel relation and having vertical webs 64, 65, respectively, spaced apart by an amount sufficient to enable the LD2 container base 40 to fit snugly therein; and, with the vertically extending web portions 64, 65 terminating at their upper ends in inwardly directed horizontal lips 66, 68, respectively, adapted to fit over a complementally shaped lip formed on the base portion 40 of the container so as to provide vertical restraint for the container. A guide track 69 (FIG. 5) is provided for guiding the base 40 of the container during movement up the skid strips 60 so that the base 40 is properly registered with the parallel tracks 61, 62 and can be moved upwardly through the tracks until it reaches a pair of stops 70, 71 (FIGS. 5 and 7) fixedly secured to the floor 29 adjacent the rear wall 48 of the bulk cargo hold 22. Thus, the arrangement is such that when the container 38 of the present invention is on-loaded, it can be moved upwardly along the skid strips with relative ease and into the parallel restraining tracks 61, 62 until it is properly positioned against the fixed stops 70, 71; at which point, a suitable spring-loaded detent-type stop 72 (FIG. 5) serves to securely lock the container 38 in position and to prevent movement of the container in a forward direction down the skid strips 60 on the inclined ramp-like floor 29. Of course, those skilled in the art will appreciate that any suitable stop mechanism can be employed other than a spring biased detent-type such as diagrammatically illustrated at 72 in FIG. 5. However, such an arrangment as that diagrammatically shown is convenient since it permits the stop to be cammed out of the way by the container 38 during on-loading while requiring deliberate manual movement in order to permit off-loading.

Waste Chute Registration

As previously indicated, and as will be understood by those skilled in the art, proper registration of the access opening 55 in the top wall of the container 44 with the waste chute is essential to the present invention in order that the waste disposal system is maintained in a fire-safe condition at all times. However, one of the features of the present invention is that the unique fire-safe container 38 can be interfaced with a known FAA approved and commercially available waste chute construction which meets all of the necessary rules and regulations pertaining to fire-safe conditions. Such a waste chute construction is described in detail in the aforesaid Ratcliff et al U.S. Pat. No. 3,866,861; and, those interested in ascertaining the specific details are referred to that patent. However, to facilitate an understanding of the present invention, the interfacing system described in the aforesaid U.S. Pat. No. 3,866,861 is briefly summarized below.

Thus, as previously described, refuse and waste materials can be inserted into the access opening 55 through the waste chute 39 only when they are in close registration and the access opening 56 is disposed immediately below the bottom opening 73 in the waste chute when the container 38 assumes its position in the bulk cargo hold 22. On the other hand, the access opening 55 does not mate with the chute 39 since, in order to allow for flexure in the deck 25, the container cannot engage the deck and, in fact, a slight clearance 74 is always provided between the deck and the top of the container as best indicated in FIGS. 1 and 4.

The refuse container 38 of the present invention, while not mating with the chute 39, does provide a seal on the underside of the chute surrounding the access opening 55 so that waste materials fed through the chute 39 into the container 38 pass downwardly through a closed passage 75. Referring more specifically to FIG. 8, it will be seen that the raised fiberglass or metal rim 56 on the container 38 surrounding the access opening 55 is positioned to engage a fiberglass or metal shoe 76 suspended from the chute and surrounding the bottom opening 73 therein and within the clearance space 74 existing between the ceiling 28 and the top of the container. The rim and shoe are sized to clear the deck and the top of the container, respectively, but nevertheless to engage one another as the container assumes its position under the chute. Moreover, the lip 56 and shoe 76 are provided with mating sloping flanks 58, 78, respectively, along the outer peripheries thereof, and one of them, in this case the shoe 76, is deflectable, so that as they abut one another, their sloping flanks 58, 78 overslide one another and enable the container 38 to take up its position below the chute 39. In this position, the rim 56 substantially registers with the shoe 76, and the shoe forms a gasket-like seal between the container 38 and the deck 25. It also forms a seal which remains operative even as the container undergoes fore and aft or sidewise movement in the bulk cargo hold 22. Ordinarily, however, the aperture 55 is larger in area than the bottom opening 73 of the chute 39 so that the chute will register with the aperture regardless of any shift which occurs in the position of the container 38.

In order to allow for the necessary deflection and to maintain the integrity of the seal, the shoe 76 is yieldably biased into its normally fully dependent condition. Thus, as shown in FIG. 8, it will be seen that the chute 39 has a peripherally stepped frame 79 around the bottom opening 73 thereof, and the frame is recessed into the ceiling of the hole and has a hollow, resiliently compressible, fiberglass sealing ring 80 bonded to the upper interior face 81 of the member 79. The inner periphery of the shoe is provided with a step therein, and the lip 82 of the step is upwardly inserted within the frame 79 and supported on a set of metal clips 84 which are disposed at spaced intervals about the bottom of the shoe. Each of the clips 84 comprises a pair of nested metal springs 85 and, in addition to serving as bracket-like supports for the shoe, they also operate to absorb the impact of the container 38 when it abuts the shoe. As will be seen upon inspection of FIG. 8, the shoe 76 is slidably engaged on the chute relative to the ceiling 28 of the bulk cargo hold 22, and is sized at the inner periphery 82 thereof so that it can shift slidably in relation to the ceiling of the hold crosswise of the chute. Moreover, the springs 85 of the clips are adapted to absorb the impact of the shoe when it is caused to undergo such shift by the impact of the container rim 56 on the flank 78 of the shoe. Simultaneously, the shoe is deflected by the rim as indicated in FIG. 8, and the deflection is absorbed into the ring 80 so that throughout the time the container 38 remains in the bulk cargo hold 22, the shoe 76 is under the bias of the ring to maintain a sealed condition with the rim 56, notwithstanding that relative movement may occur between the shoe and the rim.

Preferably, the clips 84 are adjustably mounted on the chute 39 to make it possible to adjust the position of the shoe 76 when needed.

In order to assure that the door 86 located on the floor of the aft galley cannot be opened when the container 38 is missing, the deck 25 is also equipped with an interlock device, generally indicated at 88 in FIG. 8, which is actuated by the bias of the ring 80, that is, by relaxation of the ring to the normally dependent condition of the shoe 76. The deck has a bracket 80 depending therefrom peripherally of the chute 39, and a crank arm 90 is hub mounted on the bracket to be pivoted up and down in response to the motion of the shoe 76. Pivotal force is transmitted through an elongated rod-like link 91 which is pivotally interconnected between the end of the arm 90 and the upper side of the shoe 76. The rotation of the arm 90 is transmitted, in turn, to a dog-like latching hook 92 which is upstanding on the hub 94 of the arm 90 and alternately engagable and disengagable with, and from, a similar keeper hook 95 depending from the inside face of the door 86. The arrangement is such that when the container 38 is properly positioned and the shoe 76 is deflected upwardly against the bias provided by ring 80, and only at such time, the latching hook 92 and keeper hook 95 are disengaged, thereby permitting a floor mounted handle 96 to be raised by a crew member so that the door 86 can be opened as indicated at 86'.

Those skilled in the art will appreciate from the foregoing description that there has herein been disclosed a simple, yet highly effective waste container for stowage of trash and/or refuse in a fire-safe condition together with an effective restraint system therefor, which permits the container to be easily positioned within the cramped confines of the bulk cargo hold 22 in proper registration with the waste chute 39. At the same time, since the container employs the standard LD2 base configuration 40, the container can be easily handled by standard cargo container handling systems both on the aircraft and on the ground. Moreover, the container comprises a multipurpose container which can be used not only to receive and store refuse in a fire-safe condition but, also, to handle nonflammable and/or nonhazardous cargo, as well as hazardous or flammable cargo.

I claim as my invention:

1. A fire-safe multipurpose Class D container suitable for use in receipt and stowage of waste materials inserted therein through a fire-safe waste chute formed in and extending through the deck separating the upper lobe aft galley of an aircraft from the lower lobe bulk cargo hold and adapted to be physically restrained within the bulk cargo hold during in-flight operations and wherein the bulk cargo hold is characterized by an irregular non-rectilinear shape having an upwardly and rearwardly inclined ramp-like floor and partially oblate walls converging towards the aft end of the hold, said container comprising, in combination: a standardized LD2 aircraft cargo container base compatible for use with onboard and ground located cargo handling systems, a floor mounted on said base and parallel thereto, four vertically extending walls defining two opposed pairs of walls secured to one another and to said floor in fire-safe, airtight relation, one wall in a first of said two pairs of walls being normal to said floor and the other of said walls in said first pair of walls defining an included obtuse angle with said floor with said one wall having a vertical height greater than said other wall and with said first pair of walls each having a truncated rectangular configuration adjacent its lower outboard edge, and with one wall in the second of said two pairs of walls having an inwardly and downwardly inclined lower edge adjacent the truncated portions of the walls in said first of said two pairs of walls and conformal to the configuration of the bulk cargo hold, said container being closed by a top wall which is secured to the upper edges of said four walls in airtight fire-safe relation wherein said top wall and said one wall of said first pair of walls define an included acute angle and said top wall and the other of said first pair of walls are normal to one another and wherein said container floor, top and at least one wall in each of said two opposed pairs of walls are generally conformal to and in closely spaced proximity from the ramp-like floor, ceiling and two of the walls defining said irregular non-rectilinearly shaped bulk cargo hold when positioned therein in registration with the waste chute; said top wall having an access opening formed therein for registration with the waste chute in airtight fire-safe relation; and, said container base portion including means enabling said container to be securely clamped to the floor of the bulk cargo hold in the aircraft.

* * * * *